US010070126B2

United States Patent
Guo et al.

(10) Patent No.: US 10,070,126 B2
(45) Date of Patent: Sep. 4, 2018

(54) METHOD AND APPARATUS OF INTRA MODE CODING

(75) Inventors: Mei Guo, San Jose, CA (US); Xun Guo, Beijing (CN); Shaw-Min Lei, Hsinchu (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 384 days.

(21) Appl. No.: 14/123,201

(22) PCT Filed: Apr. 18, 2012

(86) PCT No.: PCT/CN2012/074267
§ 371 (c)(1),
(2), (4) Date: Nov. 30, 2013

(87) PCT Pub. No.: WO2013/000324
PCT Pub. Date: Jan. 3, 2013

(65) Prior Publication Data
US 2014/0119439 A1    May 1, 2014

Related U.S. Application Data

(60) Provisional application No. 61/502,104, filed on Jun. 28, 2011, provisional application No. 61/509,901, filed on Jul. 20, 2011.

(51) Int. Cl.
*H04N 19/593*   (2014.01)
*H04N 19/70*    (2014.01)
(Continued)

(52) U.S. Cl.
CPC ..... *H04N 19/00763* (2013.01); *H04N 19/105* (2014.11); *H04N 19/11* (2014.11);
(Continued)

(58) Field of Classification Search
CPC .................................................. H04N 19/91
(Continued)

(56) References Cited

U.S. PATENT DOCUMENTS

2003/0113026 A1   6/2003   Srinivasan et al.
2003/0138150 A1   7/2003   Srinivasan
(Continued)

FOREIGN PATENT DOCUMENTS

CN    1605213        4/2005
CN    101310536 A   11/2008

OTHER PUBLICATIONS

Wiegand, T., et al.; "WD3 Working Draft 3 of High Efficency Video coding;" Joint Collaborative Team on Video Coding (JCT-VC) of ITU-T SG16 WP3 and ISO/IEC JTC1/SC29/WG11; Mar. 2011; pp. 1-100.

(Continued)

*Primary Examiner* — Jeremiah C Hallenbeck-Huber
*Assistant Examiner* — Mainul Hasan
(74) *Attorney, Agent, or Firm* — Oblon, McClelland, Maier & Neustadt, L.L.P.

(57) ABSTRACT

Method and apparatus for intra prediction mode coding and decoding are disclosed. In one embodiment, the encoding and decoding process assigns individual indices and codewords to DC mode and Planar mode respectively. The flag is set if the current intra prediction mode is equal to any of one or more neighboring intra prediction modes. Variable length codes are designed for a remaining mode set. If the flag is not set, the currently intra prediction mode is encoded using the variable length codes. In another embodiment, multiple most probable modes are used. If the current intra prediction mode is not equal to any of the multiple most probable modes, the current intra prediction mode is encoded using variable length codes designed for the corresponding remaining modes according the ranking order of the remaining modes.

21 Claims, 5 Drawing Sheets

(51) Int. Cl.
  *H04N 19/463* (2014.01)
  *H04N 19/91* (2014.01)
  *H04N 19/105* (2014.01)
  *H04N 19/176* (2014.01)
  *H04N 19/11* (2014.01)
  *H04N 19/157* (2014.01)

(52) U.S. Cl.
  CPC ......... *H04N 19/157* (2014.11); *H04N 19/176* (2014.11); *H04N 19/463* (2014.11); *H04N 19/593* (2014.11); *H04N 19/70* (2014.11); *H04N 19/91* (2014.11)

(58) Field of Classification Search
  USPC .................................................. 375/240.12
  See application file for complete search history.

(56) References Cited

U.S. PATENT DOCUMENTS

| | | |
|---|---|---|
| 2007/0230564 A1 | 10/2007 | Chen et al. |
| 2009/0245371 A1 | 10/2009 | Choi et al. |
| 2011/0243230 A1* | 10/2011 | Liu ...................... H04N 19/176 375/240.14 |
| 2012/0328009 A1* | 12/2012 | Sasai .................... H04N 19/197 375/240.12 |

OTHER PUBLICATIONS

Kanumuri, et al.; "CE6.ef Planar mode experiments and results;" Joint Collaborative Team on Video Coding (JCT-VC) of ITU-T SG16 WP3 and ISO/IEC JTC1/SC29/WG11; Mar. 2011; pp. 1-8.

Guo, M., et al.; "CE14 Subtest 1 The Most Probabl Mode Signaling for Luma;" Joint Collaborative Team on Video Coding (JCT-VC) of ITU-T SG16 WP3 and ISO/IEC JTC1/SC29/WG11; Mar. 2011; pp. 1-4.

Guo, M., et al.; "Updated CAVLC Tables of Intra Mode Coding with separated DC and Planar;" Joint Collaborative Team on Video Coding (JCT-VC) of ITU-T SG16 WP3 and ISO/IEC JTC1/SC29/WG11; Jul. 2011; pp. 1-3.

Park, B., et al.; "CAVLC coding for intra prediction mode;" Joint Collaborative Team on Video Coding (JCT-VC) of ITU-T SG16 WP3 and ISO/IEC JTC1/SC29/WG11; Jul. 2011; pp. 1-6.

Francois, E., et al.; "Modified Intra Mode Coding;" Joint Collaborative Team on Video Coding (JCT-VC) of ITU-T SG16 WP3 and ISO/IEC JTC1/SC29/WG11; Jul. 2011; pp. 1-7.

* cited by examiner

METHOD AND APPARATUS OF INTRA MODE CODING

CROSS REFERENCE TO RELATED APPLICATIONS

The present invention claims priority to U.S. Provisional Patent Application Ser. No. 61/502,104, filed Jun. 28, 2011, entitled "Intra Mode Coding with Independent DC and Planar", and U.S. Provisional Patent Application Ser. No. 61/509,901, filed Jul. 20, 2011, entitled "Intra Mode Coding for Fixed Number of Most Probable Modes". The present invention is also related to U.S. Non-Provisional patent application Ser. No. 13/198,697, filed Aug. 4, 2011, entitled "Method and Apparatus of Improved Intra Luma Prediction Mode Coding". The U.S. Provisional Patent Applications and U.S. Non-Provisional Patent Application are hereby incorporated by reference in their entireties.

BACKGROUND OF THE INVENTION

Field of the Invention

The present invention relates to video coding. In particular, the present invention relates to coding techniques associated with the intra prediction mode coding.

Description of the Related Art

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra mode coding is still required to process an initial picture or to periodically insert I-pictures (or Intra-coded picture, I-picture), and the I-pictures are inserted periodically to allow quick access to the compressed video data or to alleviate error propagation. Intra prediction exploits the spatial correlation within a picture or within a picture region. In order to further improve coding efficiency, the High-Efficiency Video Coding (HEVC) standard being developed exploits block-based spatial prediction extensively. In HEVC, multiple intra prediction modes are used to exploit spatial features and the number of intra prediction modes depends on the block size of a Prediction Unit (PU). For some PU block sizes (currently larger than 4×4 and smaller than 64×64), the number of intra prediction modes may be as many as 35. The intra prediction mode selected for each block has to be transmitted to the decoder side for proper decoding. The side information associated with the intra prediction mode may be substantial and therefore, accordingly various predictive coding schemes to improve the efficiency for coding intra mode have been disclosed. The intra prediction modes among neighboring blocks may be highly correlated. Therefore, the intra prediction modes from neighboring blocks that have been reconstructed may be used as a predictor for a current block. In current HEVC Test Model Version 3.0 (HM-3.0), a coding scheme for the intra prediction mode is being considered, where the intra prediction mode of a current block is compared with one or two Most Probable Modes (MPMs) that are derived from the intra modes of neighboring blocks of the current block. If the intra prediction mode of the current block is the same as one most probable mode, a single-bit flag is transmitted to indicate the case. When two most probable modes are available, an index flag is transmitted to indicate which most probable mode is used. Otherwise, a single-bit flag is transmitted along with information to indicate which one of the remaining modes corresponds to the current intra mode. While the use of one or two most probable modes has helped to improve coding efficiency, the coding efficiency may be further improved by using more most probable modes.

In HM-3.0, a context-adaptive entropy coding scheme is applied to the intra coding modes. Furthermore, within the intra mode coding, Planar is mapped to mode index 2. Thus, DC and Planar modes share one mode index (i.e., 2), one codeword in context adaptive variable-length coding (CAVLC), and one binarized representation in context adaptive binary arithmetic coding (CABAC) with respect to most probable mode signaling and remaining mode coding. An additional flag is transmitted to distinguish between DC mode and Planar mode. However, the dependent coding of DC and Planar modes may degrade coding performance.

BRIEF SUMMARY OF THE INVENTION

A method and apparatus for coding and decoding intra prediction mode of a block are disclosed. In one embodiment according to the present invention, the method and apparatus for coding intra prediction mode of a block comprise receiving a current intra prediction mode corresponding to a current block and mapping the current intra prediction mode into an index wherein DC mode and Planar mode have different mode indices so that DC and Planar modes are treated separately during the signaling of the most probable mode and the coding of remaining modes. After that, a flag is determined according to the current intra prediction mode and one or more most probable modes that are derived from the intra prediction modes of neighboring blocks of the current block. The flag is set if the current intra prediction mode is equal to any of said most probable modes. If the flag is not set, the current intra prediction mode is encoded using variable-length coding or arithmetic coding. Corresponding decoding method and apparatus are also disclosed.

In another embodiment according to the present invention, the method and apparatus for coding intra prediction mode of a block comprise receiving a current intra prediction mode corresponding to a current block and determining a flag according to the current intra prediction mode and two or more most probable modes. The flag is set if the current intra prediction mode is equal to any of said two or more most probable modes. If the flag is not set, the current intra prediction mode is encoded using variable length codes. The derivation of the variable length codes comprises determining a remaining mode set consisting of the intra prediction modes of the mode set that are not equal to any of said two or more most probable modes. The variable length codes are designed for the remaining mode set based on ranking orders, statistics or distribution model of the remaining mode set.

DETAILED DESCRIPTION OF THE INVENTION

Figure 1:
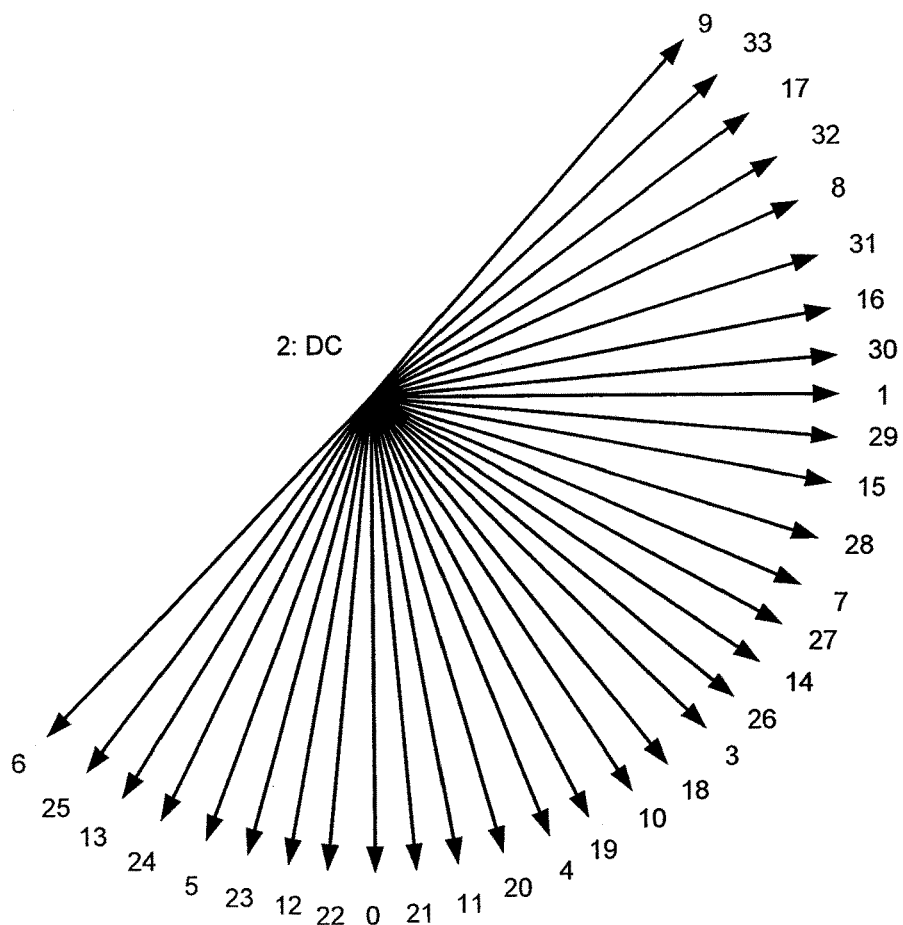
FIG. 1 illustrates 35 intra prediction modes including various angular modes, DC mode, and Planar mode (not shown) being considered for High-Efficiency Video Coding (HEVC).

Intra prediction exploits the spatial correlation within a picture or within a picture region. In order to further improve coding efficiency, the High-Efficiency Video Coding (HEVC) standard being developed exploits block-based spatial prediction extensively. In HEVC, more intra prediction modes are used to exploit spatial features and the number of intra prediction modes depends on the block size of a Prediction Unit (PU). For example, HEVC Test Model Version 3.0 (HM-3.0) being developed allows intra prediction of block (i.e., PU) at sizes of 64×64, 32×32, 16×16, 8×8, and 4×4. For each block size, multiple intra prediction modes are used as shown in Table 1. For block sizes of 32×32, 16×16, and 8×8, there are 35 modes including 33 directional prediction modes (as shown in FIG. 1), DC mode and Planar mode. For block size of 4×4, a subset of the 35 prediction modes are used. The intra prediction mode is also called intra mode for short and the set of available intra prediction modes for a given block size is called a prediction mode set or mode set in this disclosure. Accordingly, the prediction mode sets for block sizes of 32×32, 16×16, and 8×8 all contain 35 intra prediction modes and the prediction mode set for block size of 4×4 contains 18 intra prediction modes. In HM-3.0, the context-adaptive entropy coding assigns one mode index, which encoded into one codeword in variable-length coding or one binarized representation in arithmetic coding with respect to most probable mode signaling and remaining mode coding for mode DC and mode Planar to share. Accordingly, there are 34 modes to be coded for block sizes 32×32, 16×16, and 8×8, 17 modes to be coded for block size 4×4, and 3 modes to be coded for block size of 64×64 as shown in Table 1.

TABLE 1

| Block size | Number of Modes | Number of Modes to be Coded |
|---|---|---|
| 64 × 64 | 4 | 3 |
| 32 × 32 | 35 | 34 |
| 16 × 16 | 35 | 34 |
| 8 × 8 | 35 | 34 |
| 4 × 4 | 18 | 17 |

An embodiment according to the present invention assigns individual indices, individual codewords and individual binarized representations for DC mode and Planar mode. For example, DC (2), Planar (34), Vertical (0) and Horizontal (1) modes can be mapped to indices {0, 1, 2, 3} respectively. The number in parenthesis associated with each intra prediction mode indicates the mode number assignment during intra prediction according to HM-3.0. The rest of the modes can be mapped to indices by adding 1 to the respective mode numbers in HM-3.0. Therefore, the mode index mapping according to the above example can be summarized in Table 2. Other index mapping can also be used. For example, DC (2), Planar (34), Vertical (0) and Horizontal (1) modes can be mapped to indices {3, 0, 1, 2} respectively. An embodiment according to the present invention can map the indices DC (2), Planar (34), Vertical (0) and Horizontal (1) into any permutation of a mode index group consisting of 0, 1, 2 and 3. The rest of the modes can be mapped to indices by adding 1 to the respective mode numbers in HM-3.0. Therefore, the mode index mapping according to the above example can be summarized in Table 3.

TABLE 2

| Intra Modes | Mapped Indices |
|---|---|
| DC (2) | 0 |
| Planar (34) | 1 |
| Vertical (0) | 2 |
| Horizontal (1) | 3 |
| Other Modes (3, . . . , 33) | Intra Mode + 1 (4, . . . , 34) |

TABLE 3

| Intra Modes | Mapped Indices |
|---|---|
| Planar (34) | 0 |
| Vertical (0) | 1 |
| Horizontal (1) | 2 |
| DC(2) | 3 |
| Other Modes (3, . . . , 33) | Intra Mode + 1 (4, . . . , 34) |

The intra prediction modes among neighboring blocks may be highly correlated. Therefore, the intra prediction modes from neighboring blocks may be used as predictors for a current block. In HEVC, e.g., HM-3.0, a coding scheme for the intra prediction mode is being considered, where the intra prediction mode of a current block is compared with the intra prediction modes corresponding to two neighboring blocks. The configuration of the two neighboring blocks is showing in FIG. 2, where block A is on the left side and block B is on the top side of the current block. A one-bit flag, MostProbableModeFlag is used to indicate whether the current intra prediction mode can be predicted by either of the two neighboring blocks. If the current intra prediction mode can be predicted by either of the intra prediction modes corresponding to the neighboring blocks, no additional information is needed to determine the current mode if two neighboring blocks have the same intra prediction modes. Otherwise, one-bit information is needed to identify which one of the two neighboring blocks is used. If the current prediction mode cannot be predicted by any of the neighboring intra prediction modes, a syntax element RemPredMode is sent to indicate that which of the remaining modes corresponds to the current intra prediction mode. In HM-3.0, two CAVLC tables are used to code the remaining intra prediction modes, where CodingTableOne is used when both neighboring blocks have the same intra prediction mode and CodingTableTwo is used when two neighboring blocks have different intra prediction modes.

An exemplary CAVLC with embodiment of the present invention is shown in Table 4, where the table includes separate entries for DC mode and Planar mode. Table 4 illustrates an example of CAVLC table, where the codewords are listed in terms of the codeword value and the codeword length for 4×4 PU and one codeword entry is used for MostProbableModeFlag. In Table 4, a codeword having a value of 0 and a length of 4 is equivalent to a variable length code, "0000". Similarly, a codeword having a codeword value of 13 and a codeword length of 5 is equivalent to a variable length code, "01101". There are eighteen intra prediction modes for 4×4 block. If the current intra prediction is not equal to any of the neighboring intra prediction modes associated with block A and block B, the current prediction will be one of the remaining 17 intra prediction modes (block A and block B have the same intra prediction mode) or the remaining 16 intra prediction modes (block A and block B have different intra prediction modes). The indices for the remaining prediction modes are modified so that the remaining intra prediction modes will have consecutive indices from 0 to 16 or 0 to 15. An exemplary method to modify the indices of remain intra prediction modes into consecutive indices is described in U.S. Non-Provisional patent application Ser. No. 13/198,697, filed Aug. 4, 2011. Table 5 illustrates an example of CAVLC table, where the codewords are listed in terms of the codeword value and the codeword length for 4×4 PU, where MostProbableModeFlag is coded separately and not included in the table.

TABLE 4

| 4 × 4 PU, Including MostProbleModeFlag | | CodingTableOne | | CodingTableTwo | |
|---|---|---|---|---|---|
| | | Codeword | Length | Codeword | Length |
| MPM_CODEWORD (MostProbableModeFlag) | | 1 | 1 | 1 | 1 |
| RemPredMode | 0 | 0 | 4 | 1 | 4 |
| | 1 | 13 | 5 | 0 | 4 |
| | 2 | 12 | 5 | 13 | 5 |
| | 3 | 11 | 5 | 12 | 5 |
| | 4 | 10 | 5 | 11 | 5 |
| | 5 | 9 | 5 | 10 | 5 |
| | 6 | 8 | 5 | 9 | 5 |
| | 7 | 7 | 5 | 8 | 5 |
| | 8 | 6 | 5 | 7 | 5 |
| | 9 | 5 | 5 | 6 | 5 |
| | 10 | 4 | 5 | 5 | 5 |
| | 11 | 3 | 5 | 4 | 5 |
| | 12 | 2 | 5 | 31 | 6 |
| | 13 | 31 | 6 | 30 | 6 |
| | 14 | 30 | 6 | 29 | 6 |
| | 15 | 29 | 6 | 28 | 6 |
| | 16 | 28 | 6 | Null | Null |

TABLE 5

| 4 × 4 PU, Excluding MostProbleModeFlag | | CodingTableOne | | CodingTableTwo | |
|---|---|---|---|---|---|
| | | Codeword | Length | Codeword | Length |
| RemPredMode | 0 | 0 | 3 | 1 | 3 |
| | 1 | 13 | 4 | 0 | 3 |
| | 2 | 12 | 4 | 13 | 4 |
| | 3 | 11 | 4 | 12 | 4 |
| | 4 | 10 | 4 | 11 | 4 |
| | 5 | 9 | 4 | 10 | 4 |
| | 6 | 8 | 4 | 9 | 4 |
| | 7 | 7 | 4 | 8 | 4 |
| | 8 | 6 | 4 | 7 | 4 |
| | 9 | 5 | 4 | 6 | 4 |
| | 10 | 4 | 4 | 5 | 4 |
| | 11 | 3 | 4 | 4 | 4 |
| | 12 | 2 | 4 | 31 | 5 |
| | 13 | 31 | 5 | 30 | 5 |
| | 14 | 30 | 5 | 29 | 5 |
| | 15 | 29 | 5 | 28 | 5 |
| | 16 | 28 | 5 | Null | Null |

Table 6 illustrates an example of CAVLC table, where the codewords are listed in terms of the codeword value and the codeword length for block sizes 32×32, 16×16, and 8×8 and one codeword entry is used for MostProbableModeFlag. Table 7 illustrates an example of CAVLC table, where the codewords are listed in terms of the codeword value and the codeword length for block sizes 32×32, 16×16, and 8×8 and MostProbableModeFlag is coded separately and not included in the table.

TABLE 6

| 8 × 8, 16 × 16, 32 × 32 PU Including MostProbableModeFlag | | CodingTableOne | | CodingTableTwo | |
|---|---|---|---|---|---|
| | | Codeword | Length | Codeword | Length |
| MPM_CODEWORD (MostProbableModeFlag) | | 1 | 1 | 1 | 1 |
| RemPredMode | 0 | 0 | 4 | 1 | 4 |
| | 1 | 4 | 5 | 0 | 4 |
| | 2 | 3 | 5 | 4 | 5 |
| | 3 | 2 | 5 | 24 | 6 |
| | 4 | 24 | 6 | 23 | 6 |
| | 5 | 23 | 6 | 22 | 6 |
| | 6 | 22 | 6 | 21 | 6 |
| | 7 | 21 | 6 | 20 | 6 |
| | 8 | 20 | 6 | 19 | 6 |
| | 9 | 19 | 6 | 18 | 6 |
| | 10 | 18 | 6 | 17 | 6 |
| | 11 | 17 | 6 | 16 | 6 |
| | 12 | 16 | 6 | 15 | 6 |
| | 13 | 15 | 6 | 14 | 6 |
| | 14 | 14 | 6 | 13 | 6 |
| | 15 | 13 | 6 | 12 | 6 |
| | 16 | 12 | 6 | 11 | 6 |
| | 17 | 11 | 6 | 10 | 6 |
| | 18 | 10 | 6 | 62 | 7 |
| | 19 | 62 | 7 | 61 | 7 |
| | 20 | 61 | 7 | 60 | 7 |
| | 21 | 60 | 7 | 59 | 7 |
| | 22 | 59 | 7 | 58 | 7 |
| | 23 | 58 | 7 | 57 | 7 |
| | 24 | 57 | 7 | 56 | 7 |
| | 25 | 56 | 7 | 55 | 7 |
| | 26 | 55 | 7 | 54 | 7 |
| | 27 | 54 | 7 | 53 | 7 |
| | 28 | 53 | 7 | 52 | 7 |
| | 29 | 52 | 7 | 51 | 7 |
| | 30 | 51 | 7 | 50 | 7 |
| | 31 | 50 | 7 | 127 | 8 |
| | 32 | 127 | 8 | 126 | 8 |
| | 33 | 126 | 8 | Null | Null |

TABLE 7

| 8 × 8, 16 × 16, 32 × 32 PU Excluding MostProbableModeFlag | | CodingTableOne | | CodingTableTwo | |
|---|---|---|---|---|---|
| | | Codeword | Length | Codeword | Length |
| RemPredMode | 0 | 0 | 3 | 1 | 3 |
| | 1 | 4 | 4 | 0 | 3 |
| | 2 | 3 | 4 | 4 | 4 |
| | 3 | 2 | 4 | 24 | 5 |
| | 4 | 24 | 5 | 23 | 5 |
| | 5 | 23 | 5 | 22 | 5 |
| | 6 | 22 | 5 | 21 | 5 |
| | 7 | 21 | 5 | 20 | 5 |
| | 8 | 20 | 5 | 19 | 5 |
| | 9 | 19 | 5 | 18 | 5 |
| | 10 | 18 | 5 | 17 | 5 |
| | 11 | 17 | 5 | 16 | 5 |
| | 12 | 16 | 5 | 15 | 5 |
| | 13 | 15 | 5 | 14 | 5 |
| | 14 | 14 | 5 | 13 | 5 |
| | 15 | 13 | 5 | 12 | 5 |
| | 16 | 12 | 5 | 11 | 5 |
| | 17 | 11 | 5 | 10 | 5 |
| | 18 | 10 | 5 | 62 | 6 |
| | 19 | 62 | 6 | 61 | 6 |
| | 20 | 61 | 6 | 60 | 6 |
| | 21 | 60 | 6 | 59 | 6 |
| | 22 | 59 | 6 | 58 | 6 |
| | 23 | 58 | 6 | 57 | 6 |

TABLE 7-continued

| 8 × 8, 16 × 16, 32 × 32 PU Excluding | CodingTableOne | | CodingTableTwo | |
|---|---|---|---|---|
| MostProbableModeFlag | Codeword | Length | Codeword | Length |
| 24 | 57 | 6 | 56 | 6 |
| 25 | 56 | 6 | 55 | 6 |
| 26 | 55 | 6 | 54 | 6 |
| 27 | 54 | 6 | 53 | 6 |
| 28 | 53 | 6 | 52 | 6 |
| 29 | 52 | 6 | 51 | 6 |
| 30 | 51 | 6 | 50 | 6 |
| 31 | 50 | 6 | 127 | 7 |
| 32 | 127 | 7 | 126 | 7 |
| 33 | 126 | 7 | Null | Null |

The performance of a coding system incorporating an embodiment of the present invention is compared with the performance of HM-3.0. The coding system incorporating an embodiment of the present invention uses the intra prediction mode index mapping as shown in Table 2 and the CAVLC tables as shown in Tables 4 and 6. The performance is evaluated in terms of BD-rate, where a negative value indicates less bit rate required at the same level of distortion. In other words, a negative value implies performance improvement. The performance of a coding system incorporating an embodiment of the present invention versus the performance of HM-3.0 is shown in Table 8. The BD-rate is shown for Y, U and V components using various test sequences (Class A through Class E). A modest amount improvement (about 0.2%) has been observed based on the test results. There is no appreciable difference in either encoding time or decoding time. Accordingly, a coding system incorporating an embodiment of the present invention illustrates modest performance improvement without any penalty in executing time (i.e., complexity).

TABLE 8

| Intra-Low Complexity | Intra LoCO | | |
|---|---|---|---|
| | Y BD-Rate (%) | U BD-Rate (%) | V BD-Rate (%) |
| Class A | −0.2 | −0.2 | −0.1 |
| Class B | −0.2 | −0.2 | −0.2 |
| Class C | −0.2 | −0.2 | −0.2 |
| Class D | −0.2 | −0.2 | −0.2 |
| Class E | −0.2 | −0.2 | −0.1 |
| All | −0.2 | −0.2 | −0.2 |
| Enc. Time | | 100% | |
| Dec. Time | | 100% | |

Figure 3:
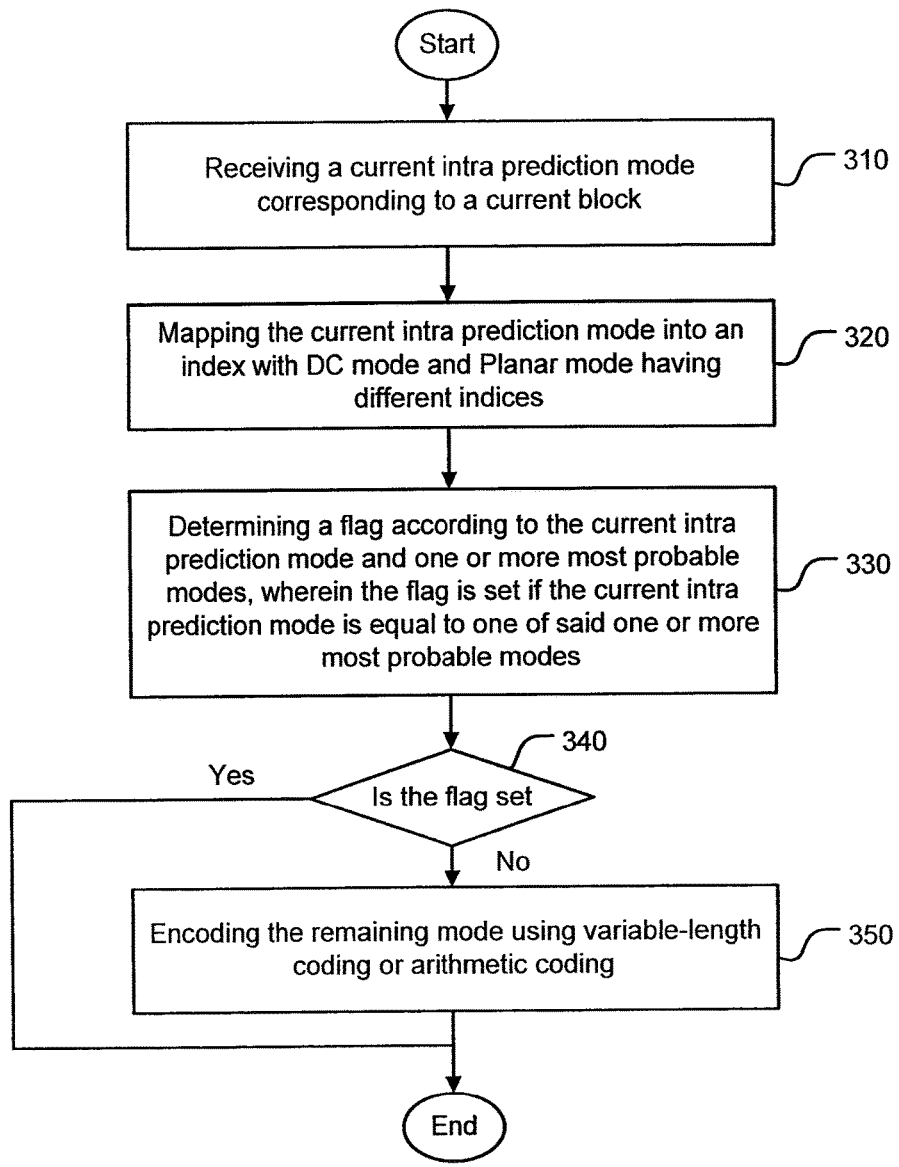
FIG. 3 illustrates a flow chart corresponding to intra prediction mode encoding according to one embodiment of the present invention.

A video coding system incorporating an embodiment of the present invention to encode the intra prediction mode is illustrated in the exemplary flow chart in FIG. 3. A current intra prediction mode to be encoded is received at step 310. The current intra prediction mode belongs to a mode set and the mode set includes DC mode and Planar mode. At step 320, the current intra prediction mode is mapped into the mode index as mentioned previously, wherein the DC mode and Planar mode have individual indices. A flag is determined according to the current intra prediction mode and one or more most probable modes as shown in step 330. The flag is set if the current intra prediction mode is equal to any of said most probable modes. The flag will be checked to see whether it is set as shown in step 340. If the flag is not set, it implies that the current prediction mode is not equal to any of the most probable modes. In this case, the current intra prediction mode will be encoded using variable length codes or arithmetic coding as shown in steps 350. If the flag is set, it implies that the current intra prediction mode is equal to one of the most probable modes. Depending on whether the number of the available most probable modes is larger than 1, additional indication may be needed to identify which one of the most probable modes is the same as the current prediction mode. The encoding process of the current prediction mode for the case that the flag is set can be the same as that used by HM-3.0 and the encoding process for the flag being set is omitted in the flow chart of FIG. 3.

Figure 4:
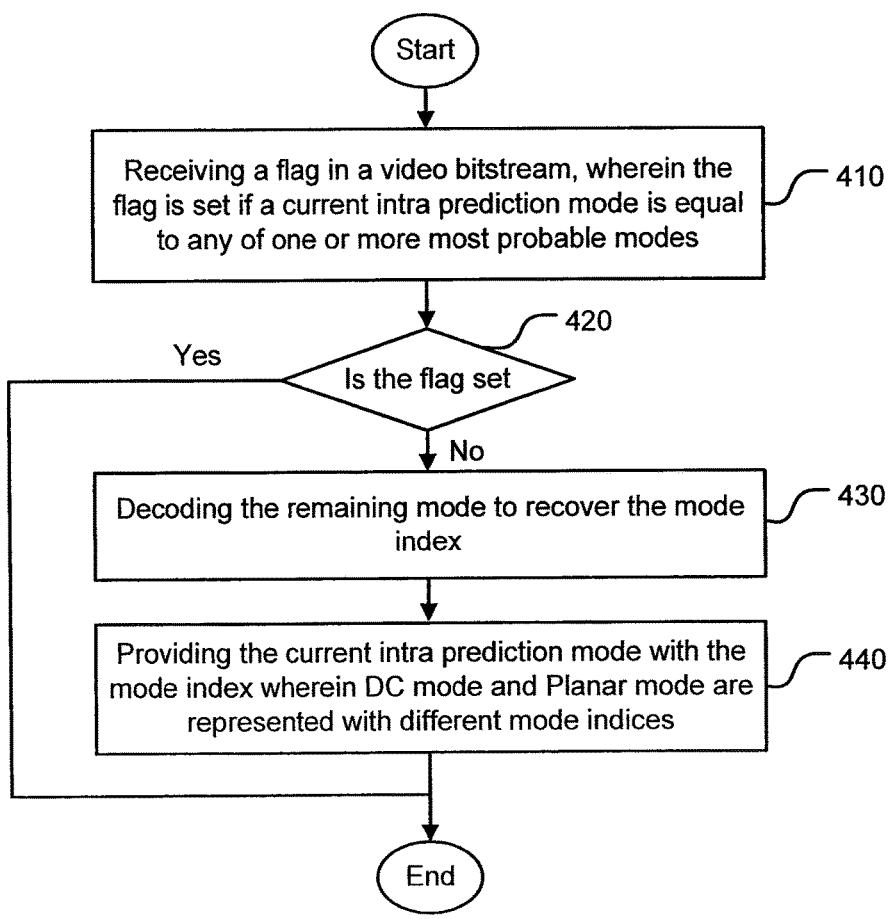
FIG. 4 illustrates a flow chart corresponding to intra prediction mode decoding according to one embodiment of the present invention.

A video decoding system incorporating an embodiment of the present invention to decode the intra prediction mode is illustrated in the exemplary flow chart of FIG. 4. A flag in a video bitstream is received as shown in step 410, wherein the flag is set if the current intra prediction mode is equal to any of most probable modes. The flag is checked to see whether it is set or not as shown in step 420. If the flag is not set, it implies that the current prediction mode is encoded using variable length codes or arithmetic coding. In this case, the current intra prediction mode will be decoded accordingly to restore/recover the mode index for the current intra prediction mode as shown in step 430. In step 440, the current intra prediction mode derived from the mode index is outputted, wherein DC mode and Planar mode have different indices. The decoding process of the current prediction mode for the case that the flag is set can be the same as that used by HM-3.0 and the decoding process for the flag being set is omitted in the flow chart of FIG. 4.

In HM-3.0, one or two most probable modes are used, where the most probable modes are derived from the intra prediction modes of two neighboring blocks. If the current intra mode is equal to either of the most probable modes, one-bit flag, MostProbableModeFlag is set to 1; otherwise MostProbableModeFlag is not set (i.e. having a value of 0). If there are two most probable modes available, one-bit indication MostProbableModeIndex is used to indicate which one of the two most probable modes is used to predict the current intra prediction mode. If the current intra prediction mode is not equal to any of the two most probable modes, MostProbableModeFlag is not set (i.e., having a value of 0) and RemPredMode is sent to indicate that which of the remaining modes corresponds to the current intra prediction mode as mentioned before. Therefore, coding can be very efficient for the case that the current intra mode is equal to a most probable mode. Accordingly, in another embodiment of the present invention, more most probable modes are used to improve coding efficiency.

Figure 2:
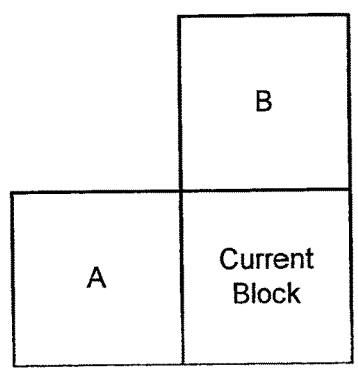
FIG. 2 illustrates an example of two neighboring blocks.

As an example, two most probable modes may be always used. The two most probable modes can be determined from the block above and the block left as shown in FIG. 2. If the intra prediction modes for the two blocks are different, the two intra prediction modes can be used as the two most probable modes. If both intra modes are the same, the other most probable mode can be selected based on one of the intra prediction modes in mode set that has the highest occurrence, such as Planar mode. Other methods to select the two most probable modes may also be used to practice the present invention. There are 18 intra prediction modes for 4×4 block (i.e., 4×4 PU). When two most probable modes are used, there are 16 remaining modes. If MostProbableModeFlag is included as one entry in the CAVLC for coding remaining modes, the table will have 17 entries; otherwise the table will have 16 entries. Table 9 illustrates an example of CAVLC table for the case of two most probable modes, where the codewords are listed in terms of the codeword value and the codeword length for 4×4 PU and one codeword entry is used for MostProbableModeFlag.

Table 10 illustrates an example of CAVLC table for two most probable modes, where the codewords are listed in terms of the codeword value and the codeword length for 4×4 PU, and MostProbableModeFlag is coded separately and not included in the table. In both Table 9 and Table 10, the codewords are listed according to the ranking order of the remaining intra prediction modes. An exemplary ranking order of the remaining intra prediction modes for 4×4 block is shown in Table 13.

TABLE 9

| 4 × 4 PU, Including MostProbleModeFlag | Codeword | Length |
|---|---|---|
| MPM_CODEWORD (MostProbableModeFlag) | 1 | 1 |
| RemPredMode 0 | 0 | 4 |
| 1 | 14 | 5 |
| 2 | 13 | 5 |
| 3 | 12 | 5 |
| 4 | 11 | 5 |
| 5 | 10 | 5 |
| 6 | 9 | 5 |
| 7 | 8 | 5 |
| 8 | 7 | 5 |
| 9 | 6 | 5 |
| 10 | 5 | 5 |
| 11 | 4 | 5 |
| 12 | 3 | 5 |
| 13 | 2 | 5 |
| 14 | 31 | 6 |
| 15 | 30 | 6 |

TABLE 10

| 4 × 4 PU, Excluding MostProbleMode Flag | Codeword | Length |
|---|---|---|
| RemPredMode 0 | 0 | 3 |
| 1 | 14 | 4 |
| 2 | 13 | 4 |
| 3 | 12 | 4 |
| 4 | 11 | 4 |
| 5 | 10 | 4 |
| 6 | 9 | 4 |
| 7 | 8 | 4 |
| 8 | 7 | 4 |
| 9 | 6 | 4 |
| 10 | 5 | 4 |
| 11 | 4 | 4 |
| 12 | 3 | 4 |
| 13 | 2 | 4 |
| 14 | 31 | 5 |
| 15 | 30 | 5 |

When two most probable modes are used for block sizes 32×32, 16×16, and 8×8, there are 33 remaining modes. If MostProbableModeFlag is included as one entry in the CAVLC for coding remaining modes, the table will have 34 entries; otherwise the table will have 33 entries. Table 11 illustrates an example of CAVLC table for two most probable modes, where the codewords are listed in terms of the codeword value and the codeword length for block sizes 32×32, 16×16, and 8×8 and one codeword entry is used for MostProbableModeFlag. Table 12 illustrates an example of CAVLC table for two most probable modes, where the codewords are listed in terms of the codeword value and the codeword length for block sizes 32×32, 16×16, and 8×8 and MostProbableModeFlag is coded separately and not included in the table. In both Table 11 and Table 12, the codewords are listed according to the ranking order of the remaining intra prediction modes. An exemplary ranking order of the remaining intra prediction modes for block sizes 32×32, 16×16, and 8×8 is shown in Table 14.

TABLE 11

| 8 × 8, 16 × 16, 32 × 32 PU, Including MostProbleModeFlag | Codeword | Depth |
|---|---|---|
| MPM_CODEWORD (MostProbableModeFlag) | 1 | 1 |
| RemPredMode 0 | 0 | 4 |
| 1 | 5 | 5 |
| 2 | 4 | 5 |
| 3 | 3 | 5 |
| 4 | 2 | 5 |
| 5 | 24 | 6 |
| 6 | 23 | 6 |
| 7 | 22 | 6 |
| 8 | 21 | 6 |
| 9 | 20 | 6 |
| 10 | 19 | 6 |
| 11 | 18 | 6 |
| 12 | 17 | 6 |
| 13 | 16 | 6 |
| 14 | 15 | 6 |
| 15 | 14 | 6 |
| 16 | 13 | 6 |
| 17 | 12 | 6 |
| 18 | 62 | 7 |
| 19 | 61 | 7 |
| 20 | 60 | 7 |
| 21 | 59 | 7 |
| 22 | 58 | 7 |
| 23 | 57 | 7 |
| 24 | 56 | 7 |
| 25 | 55 | 7 |
| 26 | 54 | 7 |
| 27 | 53 | 7 |
| 28 | 52 | 7 |
| 29 | 51 | 7 |
| 30 | 50 | 7 |
| 31 | 127 | 8 |
| 32 | 126 | 8 |

TABLE 12

| 8 × 8, 16 × 16, 32 × 32 PU, Excluding MostProbleModeFlag | Codeword | Depth |
|---|---|---|
| RemPredMode 0 | 0 | 3 |
| 1 | 5 | 4 |
| 2 | 4 | 4 |
| 3 | 3 | 4 |
| 4 | 2 | 4 |
| 5 | 24 | 5 |
| 6 | 23 | 5 |
| 7 | 22 | 5 |
| 8 | 21 | 5 |
| 9 | 20 | 5 |
| 10 | 19 | 5 |
| 11 | 18 | 5 |
| 12 | 17 | 5 |
| 13 | 16 | 5 |
| 14 | 15 | 5 |
| 15 | 14 | 5 |
| 16 | 13 | 5 |
| 17 | 12 | 5 |
| 18 | 62 | 6 |
| 19 | 61 | 6 |
| 20 | 60 | 6 |
| 21 | 59 | 6 |
| 22 | 58 | 6 |
| 23 | 57 | 6 |
| 24 | 56 | 6 |
| 25 | 55 | 6 |
| 26 | 54 | 6 |
| 27 | 53 | 6 |
| 28 | 52 | 6 |
| 29 | 51 | 6 |

TABLE 12-continued

| 8 × 8, 16 × 16, 32 × 32 PU, Excluding MostProbleModeFlag | Codeword | Depth |
|---|---|---|
| 30 | 50 | 6 |
| 31 | 127 | 7 |
| 32 | 126 | 7 |

TABLE 13

| Remaining Mode for 4 × 4 PU | Ranking order |
|---|---|
| 0 | 0 |
| 1 | 3 |
| 2 | 2 |
| 3 | 15 |
| 4 | 8 |
| 5 | 11 |
| 6 | 1 |
| 7 | 10 |
| 8 | 7 |
| 9 | 4 |
| 10 | 14 |
| 11 | 9 |
| 12 | 6 |
| 13 | 5 |
| 14 | 13 |
| 15 | 12 |

TABLE 14

| Remaining Mode for 8 × 8, 16 × 16, 32 × 32 PU | Ranking order |
|---|---|
| 0 | 0 |
| 1 | 2 |
| 2 | 3 |
| 3 | 29 |
| 4 | 1 |
| 5 | 8 |
| 6 | 30 |
| 7 | 21 |
| 8 | 28 |
| 9 | 16 |
| 10 | 7 |
| 11 | 15 |
| 12 | 20 |
| 13 | 31 |
| 14 | 9 |
| 15 | 11 |
| 16 | 6 |
| 17 | 4 |
| 18 | 5 |
| 19 | 12 |
| 20 | 10 |
| 21 | 14 |
| 22 | 22 |
| 23 | 19 |
| 24 | 17 |
| 25 | 27 |
| 26 | 13 |
| 27 | 18 |
| 28 | 23 |
| 29 | 26 |
| 30 | 32 |
| 31 | 24 |
| 32 | 25 |

As another example, four most probable modes are used. The intra prediction modes of neighboring blocks and/or pre-determined intra prediction modes may be used to determine the four most probable modes. Other methods to select the four most probable modes may also be used to practice the present invention. There are 18 intra modes for 4×4 block (i.e., PU). When four most probable modes are used, there are 14 remaining modes. If MostProbableModeFlag is included as one entry in the CAVLC for coding remaining modes, the table will have 15 entries; otherwise the table will have 14 entries. Table 15 illustrates an example of CAVLC table for the case of four most probable modes, where the codewords are listed in terms of the codeword value and the codeword length for 4×4 PU, and MostProbableModeFlag is coded separately and not included in the table. Table 16 illustrates an example of CAVLC table for the case of four most probable modes, where the codewords are listed in terms of the codeword value and the codeword length for block sizes 32×32, 16×16, and 8×8, and MostProbableModeFlag is coded separately and not included in the table. In both Table 15 and Table 16, the codewords are listed according to the ranking order of the remaining intra prediction modes. An exemplary ranking order of the remaining intra prediction modes for 4×4 block is shown in Table 17. An exemplary ranking order of the remaining intra prediction modes for block sizes 32×32, 16×16, and 8×8 is shown in Table 18.

TABLE 15

| 4 × 4PU, Excluding MostProbleModeFlag | | Codeword | Length |
|---|---|---|---|
| RemPredMode | 0 | 1 | 4 |
| | 1 | 0 | 4 |
| | 2 | 15 | 5 |
| | 3 | 14 | 5 |
| | 4 | 13 | 5 |
| | 5 | 12 | 5 |
| | 6 | 11 | 5 |
| | 7 | 10 | 5 |
| | 8 | 9 | 5 |
| | 9 | 8 | 5 |
| | 10 | 7 | 5 |
| | 11 | 6 | 5 |
| | 12 | 5 | 5 |
| | 13 | 4 | 5 |

TABLE 16

| 8 × 8, 16 × 16, 32 × 32 PU, Excluding MostProbleModeFlag | | Codeword | Length |
|---|---|---|---|
| RemPredMode | 0 | 0 | 4 |
| | 1 | 4 | 5 |
| | 2 | 3 | 5 |
| | 3 | 2 | 5 |
| | 4 | 27 | 6 |
| | 5 | 26 | 6 |
| | 6 | 25 | 6 |
| | 7 | 24 | 6 |
| | 8 | 23 | 6 |
| | 9 | 22 | 6 |
| | 10 | 21 | 6 |
| | 11 | 20 | 6 |
| | 12 | 19 | 6 |
| | 13 | 18 | 6 |
| | 14 | 17 | 6 |
| | 15 | 16 | 6 |
| | 16 | 15 | 6 |
| | 17 | 14 | 6 |
| | 18 | 13 | 6 |
| | 19 | 12 | 6 |
| | 20 | 11 | 6 |
| | 21 | 10 | 6 |
| | 22 | 62 | 7 |
| | 23 | 61 | 7 |
| | 24 | 60 | 7 |
| | 25 | 59 | 7 |
| | 26 | 58 | 7 |
| | 27 | 57 | 7 |

TABLE 16-continued

| 8 × 8, 16 × 16, 32 × 32 PU, Excluding MostProbleModeFlag | Codeword | Length |
|---|---|---|
| 28 | 56 | 7 |
| 29 | 127 | 8 |
| 30 | 126 | 8 |

TABLE 17

| Remaining Mode for 4 × 4 PU | Ranking order |
|---|---|
| 0 | 2 |
| 1 | 1 |
| 2 | 7 |
| 3 | 6 |
| 4 | 3 |
| 5 | 0 |
| 6 | 5 |
| 7 | 13 |
| 8 | 4 |
| 9 | 8 |
| 10 | 9 |
| 11 | 10 |
| 12 | 12 |
| 13 | 11 |

TABLE 18

| Remaining Mode for 8 × 8, 16 × 16, 32 × 32 PU | Ranking order |
|---|---|
| 0 | 2 |
| 1 | 1 |
| 2 | 0 |
| 3 | 27 |
| 4 | 7 |
| 5 | 28 |
| 6 | 5 |
| 7 | 6 |
| 8 | 14 |
| 9 | 8 |
| 10 | 15 |
| 11 | 29 |
| 12 | 4 |
| 13 | 3 |
| 14 | 19 |
| 15 | 10 |
| 16 | 13 |
| 17 | 9 |
| 18 | 11 |
| 19 | 16 |
| 20 | 20 |
| 21 | 26 |
| 22 | 12 |
| 23 | 18 |
| 24 | 17 |
| 25 | 21 |
| 26 | 25 |
| 27 | 30 |
| 28 | 24 |
| 29 | 22 |
| 30 | 23 |

Figure 5:
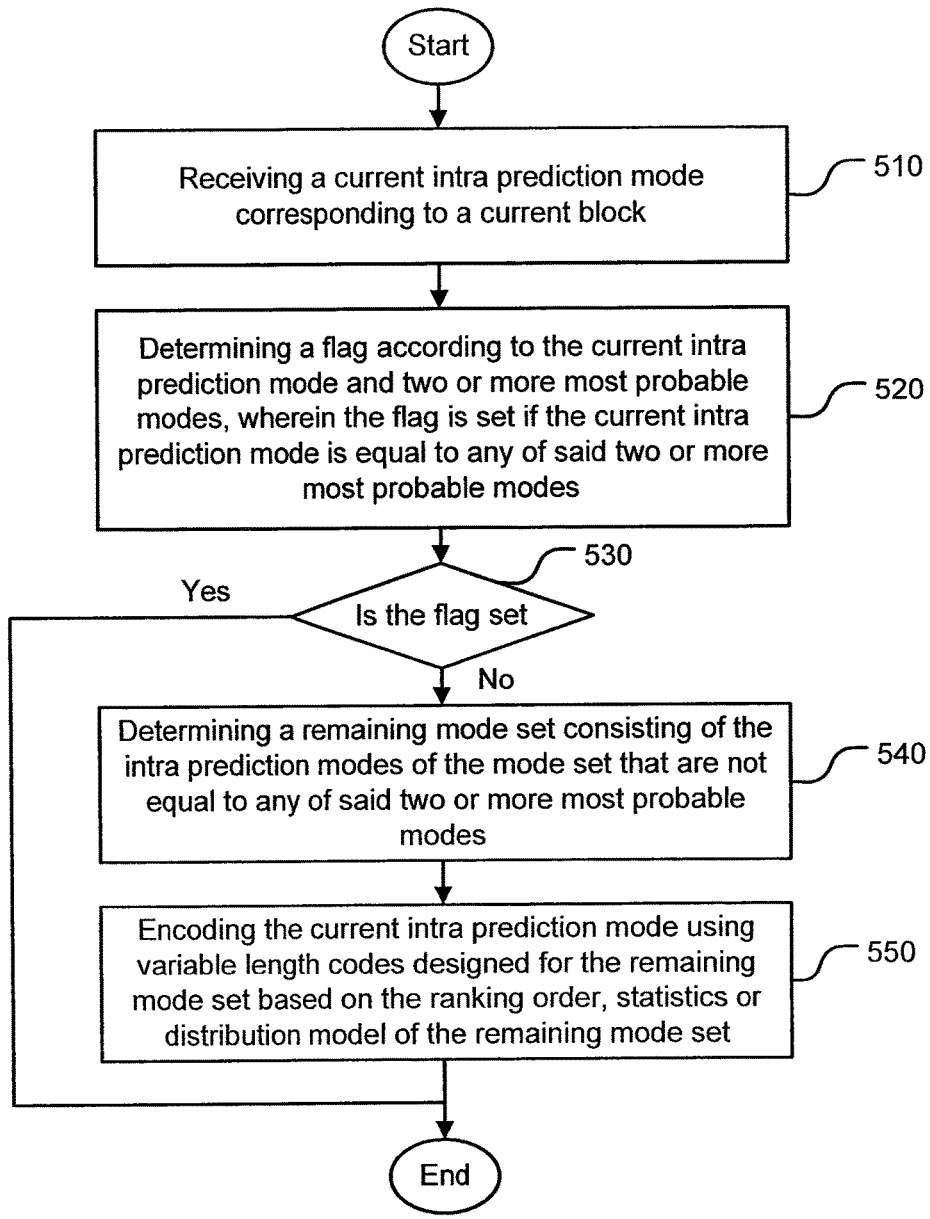
FIG. 5 illustrates a flow chart corresponding to intra prediction mode encoding according to another embodiment of the present invention.

A video coding system incorporating an embodiment of the present invention to encode the intra prediction mode is illustrated in the exemplary flow chart of FIG. 5. A current intra prediction mode to be encoded is received at step 510. A flag is determined according to the current intra prediction mode and two or more most probable modes as shown in step 520. The flag is set if the current intra prediction mode is equal to any of said two or more most probable modes. The flag will be checked to see whether it is set as shown in step 530. If the flag is not set, it implies that the current prediction mode is not equal to any of said two or more most probable modes. In this case, the current intra prediction mode will be encoded using variable length codes as shown in steps 540 through 550. In step 540, a remaining mode set is determined that consists of the intra prediction modes of the mode set that are not equal to any of said two or more most probable modes. In step 550, the current intra prediction mode is encoded using variable length codes designed for the remaining mode set based on ranking orders, statistics or distribution model of the remaining mode set. If the flag is set, it implies that the current intra prediction mode is equal to one of said two or more most probable modes. An additional indication may be needed to identify which one of said two or more most probable modes is the same as the current prediction mode. The encoding process of the current prediction mode for the case that the flag is set is omitted in the flow chart of FIG. 5.

Figure 6:
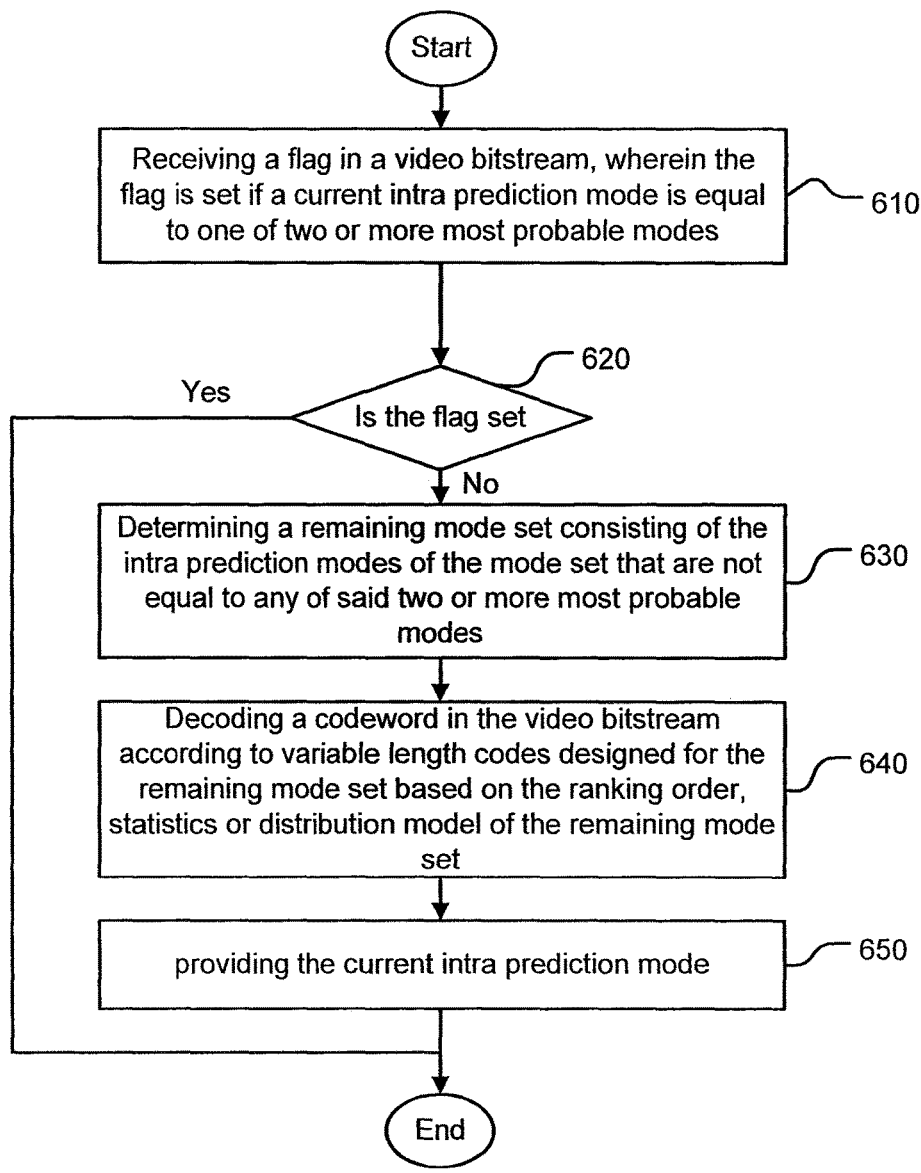
FIG. 6 illustrates a flow chart corresponding to intra prediction mode decoding according to another embodiment of the present invention.

A video decoding system incorporating an embodiment of the present invention to decode the intra prediction mode is illustrated in the exemplary flow chart of FIG. 6. A flag in a video bitstream is received as shown in step 610, wherein the flag is set if a current intra prediction mode is equal to any of two or more most probable modes. The flag will be checked to see whether it is set as shown in step 620. If the flag is not set (i.e., having a value of 0), it implies that the current intra prediction mode is encoded using variable length codes. In this case, the current intra prediction mode will be decoded using variable length codes as shown in steps 630 through 650. In step 630, a remaining mode set consisting of the intra prediction modes of the mode set that are not equal to any of said two or more most probable modes is determined. In step 640, a codeword in the video bitstream is decoded according to variable length codes designed for the remaining mode set based on the ranking order, statistics or distribution model of the remaining mode set. In step 650, the current intra prediction mode is outputted. The decoding process of the current prediction mode for the case that the flag is set is omitted in the flow chart of FIG. 6.

Embodiment of video systems incorporating encoding or decoding of intra prediction mode according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of decoding a block, the method comprising:
receiving a flag indicating whether a current intra prediction mode is equal to any of one or more most probable modes;
deriving, by a processor of a decoding apparatus based on a value of the flag, the current intra prediction mode from a decoded mode index by applying a context-adaptive entropy decoding process associated with variable length coding or arithmetic coding; and
decoding, by the processor of the decoding apparatus, the block according to the current intra prediction mode identified by the decoded mode index,
wherein
the current intra prediction mode belongs to a mode set that comprises a DC mode, a Planar mode, and at least one directional mode, each mode of the mode set being represented by a different mode index value,
the deriving the current intra prediction mode from the decoded mode index comprises:
when the decoded mode index corresponds to a first mode index value that represents the DC mode, deriving the current intra prediction mode to be the DC mode; and
when the decoded mode index corresponds to a second mode index value that represents the Planar mode, deriving the current intra prediction mode to be the Planar mode,
the first mode index value is first in a predetermined order among mode index values of modes of the mode set, and
the second mode index value is second in the predetermined order among the mode index values of the modes of the mode set.

2. The method of claim 1, wherein
the mode set further comprising a Vertical mode and a Horizontal mode, and
the DC mode, the Planar mode, the Vertical mode, and the Horizontal mode are mapped into any permutation of a mode index group consisting of mode index values including 0, 1, 2, and 3.

3. The method of claim 1, further comprising, if the flag indicates that the current intra prediction mode is not equal to any of the one or more most probable modes, determining a remaining mode set consisting of the intra prediction modes of the mode set that are not equal to any of the one or more most probable modes,
wherein the variable length coding is designed based on the mode index values and a ranking order of the remaining mode set.

4. The method of claim 3, wherein
the variable length coding is based on a first table or a second table,
the first table is selected when two neighboring intra prediction modes of two neighboring blocks of the block are equal, and
the second table is selected when the two neighboring intra prediction modes are not equal.

5. The method of claim 4, wherein
the first table comprises code lengths associated with seventeen intra prediction modes of the remaining mode set and the flag for 4×4 block size, and
the code lengths are {4, 5, 5, 5, 5, 5, 5, 5, 5, 5, 5, 5, 5, 6, 6, 6, 6, 1} for the seventeen intra prediction modes and the flag.

6. The method of claim 4, wherein
the second table comprises code lengths associated with sixteen intra prediction modes of the remaining mode set and the flag for 4×4 block size, and
the code lengths are {4, 4, 5, 5, 5, 5, 5, 5, 5, 5, 5, 5, 6, 6, 6, 6, 1} for the sixteen intra prediction modes and the flag.

7. The method of claim 4, wherein
the first table comprises code lengths associated with seventeen intra prediction modes of the remaining mode set for 4×4 block size,
the code lengths are {3, 4, 4, 4, 4, 4, 4, 4, 4, 4, 4, 4, 4, 5, 5, 5, 5} for the seventeen intra prediction modes, and
the first table does not include the flag.

8. The method of claim 4, wherein
the second table comprises code lengths associated with sixteen intra prediction modes of the remaining mode set for 4×4 block size,
the code lengths are {3, 3, 4, 4, 4, 4, 4, 4, 4, 4, 4, 4, 5, 5 5, 5} for the sixteen intra prediction modes, and
the second table does not include the flag.

9. The method of claim 4, wherein
the first table comprises code lengths associated with 34 intra prediction modes of the remaining mode set and the flag for 32×32, 16×16, and 8×8 block sizes, and
the code lengths are {4, 5, 5, 5, 6, 6, 6, 6, 6, 6, 6, 6, 6, 6, 6, 6, 6, 6, 6, 6, 7, 7, 7, 7, 7. 7, 7, 7, 7, 7, 7, 7, 7, 8, 8, 1} for the 34 intra prediction modes and the flag.

10. The method of claim 4, wherein the second table comprises code lengths associated with 33 intra prediction modes of the remaining mode set and the flag for 32×32, 16×16, and 8×8 block sizes, and
the code lengths are {4, 4, 5, 6, 6, 6 6, 6, 6, 6, 6, 6, 6, 6, 6, 6, 6, 7, 7 7 7, 7 7 7,7, 7, 7, 7, 7, 7, 8, 8, 1}for the 33 intra prediction modes and the flag.

11. The method of claim 4, wherein
the first table comprises code lengths associated with 34 intra prediction modes of the remaining mode set for 32×32, 16×16, and 8×8 block sizes,
the code lengths are {3, 4, 4, 4, 5, 5 5, 5, 5, 5, 5, 5, 5, 5, 5, 5, 5, 5, 5, 6, 6, 6, 6, 6 6, 6, 6, 6, 6, 6, 6, 6, 6, 7, 7} for the 34 intra prediction modes, and
the first table does not include the flag.

12. The method of claim 4, wherein
the second table comprises code lengths associated with 33 intra prediction modes of the remaining mode set for 32×32, 16×16, and 8×8 block sizes,
the code lengths are {3, 3, 4, 5, 5, 5, 5, 5, 5, 5, 5 5, 5, 5, 5, 5, 5, 5, 5 6, 6, 6, 6, 6, 6, 6, 6, 6 6, 6, 6, 6, 7, 7} for the 33 intra prediction modes, and
the second table does not include the flag.

13. The method of claim 3, wherein
the variable length coding is based on a first table or second table,
the first table is selected when the flag is coded using variable length code table, and
the second table is selected when the flag is coded separately.

14. An apparatus of decoding a block, the apparatus comprising:
a processor configured to execute executable code to cause the processor to:
receive a flag indicating whether a current intra prediction mode is equal to one or more most probable modes;

derive, based on a value of the flag, the current intra prediction mode from a decoded mode index by applying a context-adaptive entropy decoding process associated with variable length coding or arithmetic coding; and decode the block according to the current intra prediction mode identified by the decoded mode index, wherein the current intra prediction mode belongs to a mode set that comprises a DC mode, a Planar mode, and at least one directional mode, each mode of the mode set being represented by a different mode index value, the processor is configured to:

when the decoded mode index corresponds to a first mode index value that represents the DC mode, derive the current intra prediction mode to be the DC mode; and when the decoded mode index corresponds to a second mode index value that represents the Planar mode, derive the current intra prediction mode to be the Planar mode, the first mode index value is first in a predetermined order among mode index values of modes of the mode set, and the second mode index value is second in the predetermined order among the mode index values of the modes of the mode set.

15. A method of encoding a block, the method comprising:

receiving a current intra prediction mode corresponding to the block, the current intra prediction mode belonging to a mode set that comprises a DC mode, a Planar mode, and at least one directional mode, each mode of the mode set being represented by a different mode index value;

mapping, by a processor of an encoding apparatus, the current intra prediction mode into a mode index based on a corresponding mode index value that represents the current intra prediction mode;

including a flag indicating whether the current intra prediction mode is equal to any of one or more most probable modes into a bitstream; and encoding, by the processor of the encoding apparatus based on a value of the flag, the mode index of the current intra prediction mode by applying a context-adaptive entropy encoding process associated with variable length coding or arithmetic coding, wherein the encoding the mode index of the current intra prediction mode comprises:

when the current intra prediction mode is the DC mode, set the mode index according to a first mode index value that represents the DC mode; and when the current intra prediction mode is the Planar mode, set the mode index according to a second mode index value that represents the Planar mode, the first mode index value is first in a predetermined order among mode index values of modes of the mode set, and the second mode index value is second in the predetermined order among the mode index values of the modes of the mode set.

16. The method of claim 15, wherein the mode set further comprising a Vertical mode and a Horizontal mode, and the DC mode, the Planar mode, the Vertical mode and the Horizontal mode are mapped into any permutation of a mode index group consisting of mode index values including 0, 1, 2, and 3.

17. The method of claim 15, further comprising, if the flag indicates that the current intra prediction mode is not equal to any of the one or more most probable modes, determining a remaining mode set consisting of the intra prediction modes of the mode set that are not equal to any of the one or more most probable modes, wherein the variable length coding is designed based on the mode index values and a ranking order of the remaining mode set.

18. The method of claim 17, wherein the variable length coding is based on a first table or a second table, the first table is selected when two neighboring intra prediction modes of two neighboring blocks of the block are equal, and the second table is selected when the two neighboring intra prediction modes are not equal.

19. The method of claim 17, wherein the variable length coding is based on a first table or a second table, the first table is selected when the flag is coded using a variable length code table, and the second table is selected when the flag is coded separately.

20. An apparatus of encoding a block, the apparatus comprising:

a processor configured to execute executable code to cause the processor to:

receive a current intra prediction mode corresponding to the block, the current intra prediction mode belonging to a mode set that comprises a DC mode, a Planar mode, and at least one directional mode, each mode of the mode set being represented by a different mode index value;

map the current intra prediction modes into a mode index based on a corresponding mode index value that represents the current intra prediction mode;

include a flag indicating whether the current intra prediction mode is equal to any of one or more most probable modes into a bitstream; and encode, based on a value of the flag, the mode index of the current intra prediction mode by applying a context-adaptive entropy encoding process associated with variable length coding or arithmetic coding, wherein the processor is configured to:

when the current intra prediction mode is the DC mode, set the mode index according to a first mode index value that represents the DC mode; and when the current intra prediction mode is the Planar mode, set the mode index according to a second mode index value that represents the Planar mode, the first mode index value is first in a predetermined order among mode index values of modes of the mode set, and the second mode index value is second in the predetermined order among the mode index values of the modes of the mode set.

21. The method of claim 1, wherein the first mode index value is associated with a first codeword that is first in a predetermined order in the variable length coding or a first binarized representation that is first in a predetermined order in the arithmetic coding; and the second mode index value is associated with a second codeword that is second in the predetermined order in the variable length coding or a second binarized representation that is second in the predetermined order in the arithmetic coding.

\* \* \* \* \*